(12) United States Patent
Lance et al.

(10) Patent No.: US 9,189,754 B2
(45) Date of Patent: *Nov. 17, 2015

(54) ADDING SYNDICATION FEEDS TO CALENDAR APPLICATION ITEMS

(75) Inventors: John M. Lance, Littleton, MA (US); Chris Stoner, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 750 days.

This patent is subject to a terminal disclaimer.

(21) Appl. No.: 13/564,796

(22) Filed: Aug. 2, 2012

(65) Prior Publication Data

US 2012/0297312 A1    Nov. 22, 2012

Related U.S. Application Data

(63) Continuation of application No. 11/775,453, filed on Jul. 10, 2007, now Pat. No. 8,280,984.

(51) Int. Cl.
*G06F 15/16* (2006.01)
*G06Q 10/00* (2012.01)

(52) U.S. Cl.
CPC ....................................... *G06Q 10/00* (2013.01)

(58) Field of Classification Search
CPC ........................................................ G06Q 10/00
USPC .................................................. 709/200, 204
See application file for complete search history.

(56) References Cited

U.S. PATENT DOCUMENTS

| | | | |
|---|---|---|---|
| 6,018,343 A * | 1/2000 | Wang et al. ................... | 715/733 |
| 7,827,240 B1 * | 11/2010 | Atkins et al. .................. | 709/204 |
| 2005/0076384 A1 * | 4/2005 | Upendran et al. ............. | 725/109 |
| 2006/0184617 A1 | 8/2006 | Nicholas et al. | |
| 2006/0247961 A1 | 11/2006 | Klemow | |
| 2007/0204308 A1 * | 8/2007 | Nicholas et al. ................ | 725/86 |
| 2008/0046369 A1 * | 2/2008 | Wood ............................. | 705/50 |
| 2008/0052162 A1 * | 2/2008 | Wood ............................. | 705/14 |
| 2008/0052343 A1 * | 2/2008 | Wood ............................. | 709/202 |
| 2008/0162247 A1 * | 7/2008 | Hurmola et al. .................. | 705/9 |
| 2008/0162614 A1 * | 7/2008 | Hurmola et al. ............... | 708/112 |
| 2008/0244091 A1 * | 10/2008 | Moore et al. .................. | 709/246 |
| 2008/0282293 A1 * | 11/2008 | Frechter et al. ................. | 725/58 |
| 2009/0254612 A1 * | 10/2009 | Mayer ........................... | 709/203 |

* cited by examiner

*Primary Examiner* — Anthony Mejia
(74) *Attorney, Agent, or Firm* — Patents on Demand P.A.; Brian K. Buchheit; Scott M. Garrett

(57) ABSTRACT

A user of a calendar application subscribes to a syndication feed corresponding to an event recorded at the calendar application in a calendar data format. The syndication feed commences sending feed data to the user upon occurrence of the event. The feed data indicates a status of the event. The syndication feed binds to a feed data entry in the calendar application that is associated with the calendar item. The feed data of the syndication feed is converted from a feed format to the calendar data format usable by the calendar application to produce converted feed data. The converted feed data is presented in the calendar application proximate to the calendar item. One or more of the subscribing, binding, converting, and presenting is performed by a computing device.

20 Claims, 3 Drawing Sheets

ADDING SYNDICATION FEEDS TO CALENDAR APPLICATION ITEMS

CROSS REFERENCE TO RELATED APPLICATION

This application is a continuation of U.S. patent application Ser. No. 11/775,453, filed Jul. 10, 2007 (pending), which is incorporated herein in its entirety.

BACKGROUND

Embodiments of the present invention relate to the field of calendar data exchange technologies.

Internet Calendaring and Scheduling Core Object Specification (iCalendar) is a standard for calendar data exchange, which is defined by Request for Comments (RFC) 2445 of the Internet Engineering Task Force (IETF). This standard permits the exchange of meetings times, to-do entries, and other data among compliant applications. ICalendar data is typically exchanged using traditional email programs; however the standard is designed to be independent of any transport protocol. Currently, Web servers exist that distribute iCalendar data about an event and publish these event times to a group of interested people. Further, iCalendar data is presently being embedded in Web pages, typically using hCalendar, which is a microformat representation of iCalendar in semantic (X)HTML. Generally, users are able to publish and subscribe to iCalendar data.

A syndication feed, such as a Really Simple Syndication (RSS) or an ATOM feed, are used to provide items containing short descriptions of Web content together with a link to a full version of the content. Syndication feeds are used to publish frequently updated content, such as BLOG entries, news headlines, or podcasts. Feed content can be read using a feed reader or an aggregator. That is, users subscribe to a feed by entering the feed's link into the reader. The reader regularly checks subscribed feeds for new content and downloads any new content related to these feeds.

At present, syndication feeds and iCalendar data are disparate and incompatible mechanisms through which users can acquire time linked information. No current program or mechanism exists for binding syndication feeds to iCalendar entries.

BRIEF SUMMARY

One aspect of the present invention can include a method of handling syndication feed information that includes a step of subscribing to a syndication feed. The syndication feed can be bound to a calendar data item. Feed data from the syndication feed can be presented in a calendar application proximate to a calendar item associated with the calendar data item.

Another aspect of the present invention can include a calendar application stored in a machine readable medium that includes a calendar data exchange engine, a feed reader, and multiple calendar entries managed by the calendar application. The calendar data exchange engine can support an acquisition and publication of calendar data exchange formatted data. The feed reader can acquire syndication feed data from a feed source. At least one of the calendar entries can include data processed by the calendar data exchange engine from a calendar data exchange formatted file. At least one of the calendar entries can be programmatically linked to the feed source which provides syndication feed data in accordance with a subscription. Feed data from the subscription can be automatically placed in the calendar entry without user intervention whenever syndication feed updates are obtained by the feed reader.

Still another aspect of the present invention can include a software interface including one or more calendar entry visual elements, a calendar data exchange import tool, and a syndication feed establishment tool. Each of the calendar entry visual elements can be associated with a date/time within which editable information is able to be presented within the software interface. The calendar data exchange import tool can automatically obtain calendar data from a calendar publication formatted in a calendar data exchange format. Calendar data obtained using the calendar data exchange import tool can be automatically presented in suitable ones of the calendar entry visual elements. The syndication feed establishment tool can bind a user specified syndication feed to one of the at least one calendar entry visual element. After being bound, feed data obtained from the specified syndication feed can be automatically placed in calendar entries to which the feed is bound without user intervention.

BRIEF DESCRIPTION OF THE SEVERAL VIEWS OF THE DRAWINGS

There are shown in the drawings, embodiments which are presently preferred, it being understood, however, that the invention is not limited to the precise arrangements and instrumentalities shown.

DETAILED DESCRIPTION

Figure 1:
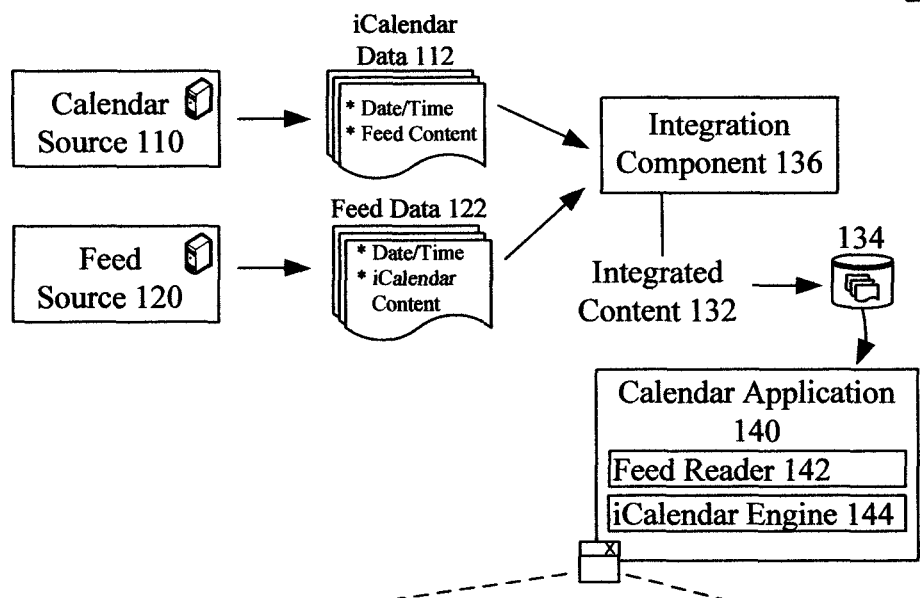
FIG. 1 is a diagram of a system which adds syndication feeds to calendar data exchange enabled programs in accordance with an embodiment of the inventive arrangements disclosed herein.
Figure 1:
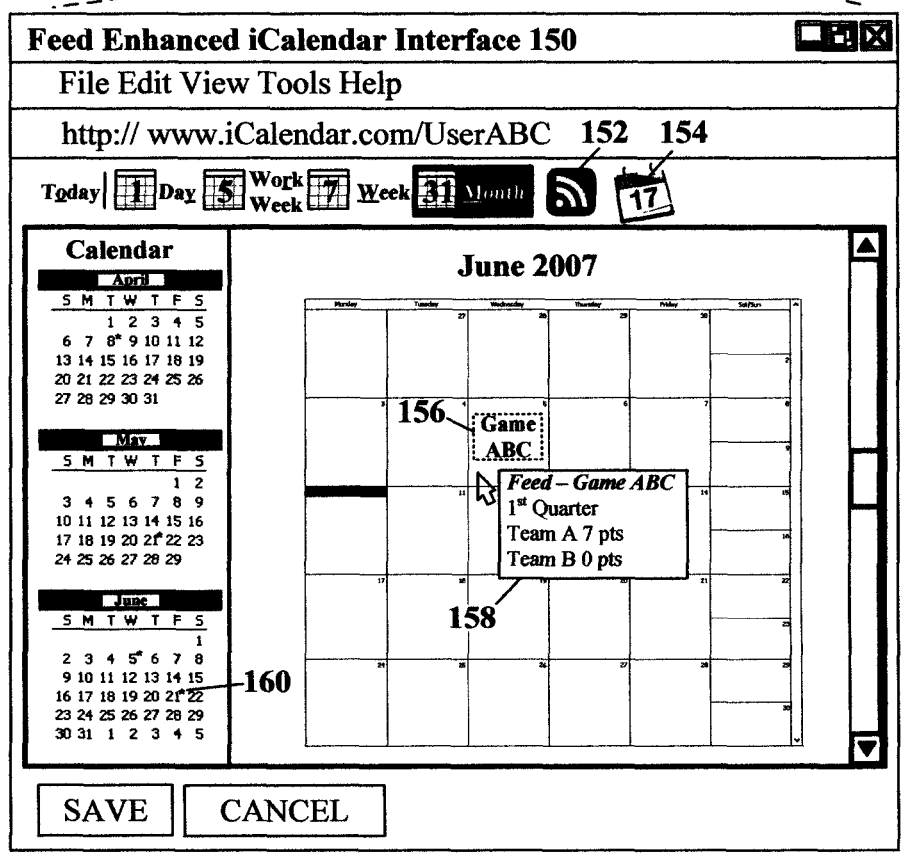

The present invention discloses a solution for adding syndication feeds to calendar data exchange enabled programs, such as programs conforming to the iCalendar (iCal) standard. Default syndication feed links can be established by a publisher of iCalendar data. Subscribers of iCalendar data can replace default syndication feeds with feeds from other sources and/or add their own syndication feeds to a program that supports iCalendar data. Information obtained from the syndication feeds can be stored in a calendar entry indexed fashion so that users accessing an iCalendar program can view information obtained from the syndication feeds as well as information related to an iCalendar subscription.

For example, a user can subscribe to iCalendar data that provides a schedule for a sports team. Individual sports games can be associated with iCalendar formatted entries which are placed in suitable dates/times of a calendar application. Each sports event can also be associated with a syndication feed, which updates event data in near-real time. For instance, when the sports event is a baseball game, the syndication feed can provide a running box score as a game is played. Whenever the user accesses the calendar application, the running box score and other feed provided information can be displayed along with the iCalendar data. After the sports event, a user can view feed provided data by selecting a calendar day of the event via the calendar application.

Many combinative gains can be achieved by integrating iCalendar data and syndication feeds which have implementations outside the realm of sports. For example, integrating a weather feed to a calendar can allow a calendar user to view weather forecasts and actual weather conditions for any calendar day. It should be appreciated that a feed subscription is independent of an iCalendar subscription. Feed provided data can also by automatically updated in the calendar application without user interventions. In one embodiment of the invention, programmatic actions linked to feed provided data can be established to automatically trigger programmatic events depending upon feed provided content. For instance, when weather data from a weather feed indicates conditions adverse to a scheduled sporting event, that event can be automatically rescheduled in accordance with user/programmer established rules.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a diagram of a system 100 which adds syndication feeds to calendar data exchange enabled programs in accordance with an embodiment of the inventive arrangements disclosed herein. More specifically, calendar data 112 from a calendar source 110 and feed data 122 from a feed source 120 can be integrated by an integration component 136 to create integrated content 132, which is stored in a data store 134. Data store 134 can be accessed by a calendar application 140, which presents both types of data 112, 122 in a single interface 150.

The data 112, 122 can be integrated with calendar items, such as specific dates and times. As shown, a calendar item of Jun. 5, 2007 can be associated with a calendar data entry 156 and a feed data entry 158. Specifically, the calendar entry 156 can be for a sports game and the feed data entry 158 can present game details which can include near-real time updates.

In system 100, the syndication feed associated with source 120, data 122, and entry 158 can be any type of Web feed including a Really Simple Syndication (RSS) based feed or an ATOM based feed. The calendar data exchange format associated with source 110, data 112, and entry 156 can be any format for exchanging calendar data, such as standards based formats of iCalendar (iCal) and a vCalendar (vCal) based format. The iCalendar format is a format defined by Request for Comments (RFC) 2445 of the Internet Engineering Task Force (IETF). The vCal is an older format that was promulgated by the Internet Mail Consortium (IMC). For simplicity of expression, iCal, which is presently a predominant calendar exchange standard, is used throughout this document to refer to any defined calendar data exchange format.

In other words, it should be understood that the invention is not to be construed as limited to format constraints specific to the iCalendar format and can be applied to any standard. For example, integration of syndication feeds can be integrated in accordance with the solution details presented herein, with a proprietary calendaring format, such as that used by LOTUS NOTES, KORGANIZER, MICROSOFT OUTLOOK, and the like. Use of a standardized calendar format, such as iCal, is advantageous since it defines a standard through which users can publish calendar data, which is made available to subscribing users who possibly use different calendar applications from that of the publisher. Thus, use of iCalendar facilitates calendar related information sharing.

The interface 150 can include a calendar data button 154 which permits a user to import and/or export iCalendar data to and/or from the calendar application 140. For example, a user can select the calendar data button 154 and then enter a location of a calendar source 110 that publishes a sport's teams schedule in an iCalendar format (data 112). The iCalendar engine 144 can process this calendar data 112 and populate appropriate calendar items. For example, when the iCalendar data 112 indicates that the team is to play GAME ABC on Jun. 5, 2007, an appropriate calendar event 156 can be recorded and displayed. In one optional configuration, the calendar source 110 can specify a default syndication feed for providing feed data 122 relating to GAME ABC.

Interface 150 is able to handle feed information that is tied to calendar items, whether the feed is specified by calendar source 110 within iCalendar data 112 or by a user of interface 150. Established feeds can be visually shown by displaying a feed indicator 160 next to a feed bound calendar item. The user can establish a new feed or edit an existing one using feed button 152. For example, a user can select feed button 152 which presents a configuration window that permits a user to subscribe to feed source 120 and to associate this subscription to calendar fields. As shown, a syndication feed associated with GAME ABC information can be bound to Jun. 5, 2007. Once bound, a feed reader 142 can periodically query the feed source 120 and acquire updated information as available. Updates can be dynamically presented in a window 158 proximate to the bound calendar field (Jun. 5, 2007).

In one embodiment, the window 158 containing feed information can be a fly-over window which automatically appears when a pointer is positioned over a calendar item to which the corresponding feed is bound. Before window 158 is presented, a query can be performed to determine whether any updated feed information exists. If so, the updated information can be automatically acquired then displayed in window 158. The feed data 122 can be incorporated in a variety of ways and is not limited to use of a fly-over window 158. For example, the feed data 122 can be inserted directly into a calendar field (entry 156) and integrated with iCalendar data 112 or user provided data. In another example, a feed window (not shown) can be included in interface 150 which is populated with suitable feed derived information whenever a feed bound calendar entry 156 is selected. In still another example, a Web link to feed data can be presented in the entry 156, where selecting the link displays the associated feed data within a browser instance or within a browser tab.

Integrating feed data 122 with calendar items/entries can result from explicit user commands to integrate a feed with a calendar item/entry or from implicit commands based upon content of the feed data 122. For example, the feed data 122 can include a date/time element which is automatically matched against a corresponding calendar entry. The iCalendar engine 144 and/or integration component 136 can perform these matching operations. Additionally, the integration component 136 can process the feed data 122 so that it is indexed, integrated, and/or converted into a form able to interact with iCalendar data 112 and/or user entered calendar data. This processed form of the data 112 and/or 122 is collectively referred to as the integrated content 132. Further, the iCalendar engine 144 can archive processed feed data 122 so that it can be later retrieved and presented when a calendar item to which the feed is bound is selected.

Feed data 122, iCalendar data 112, indexing data, manually entered calendar data, and the like, can be stored in data store 134. The data store 134 can be a physical or virtual storage space configured to store digital information. Data store 134 can be physically implemented within any type of hardware including, but not limited to, a magnetic disk, an optical disk, a semiconductor memory, a digitally encoded plastic memory, a holographic memory, or any other recording medium. Data store 134 can be a stand-alone storage unit as well as a storage unit formed from a plurality of physical devices. Additionally, information can be stored within data store 134 in a variety of manners. For example, information can be stored within a database structure or can be stored within one or more files of a file storage system where each file may or may not be indexed for information searching purposes. Further, the data store 134 can utilize one or more encryption mechanisms to protect stored information from unauthorized access.

Figure 2:
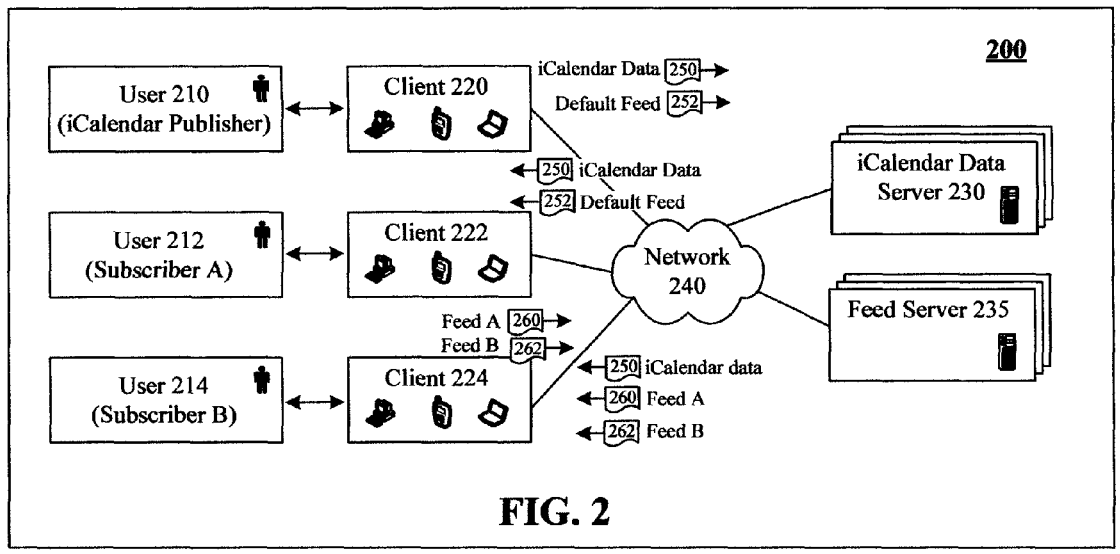
FIG. 2 is a diagram of a system in which users publish calendar data which is integrated with one or more syndication feeds in accordance with an embodiment of the inventive arrangements disclosed herein.

FIG. 2 is a diagram of a system 200 in which users 210-214 publish and/or subscribe to calendar data which is integrated with one or more syndication feeds in accordance with an embodiment of the inventive arrangements disclosed herein. System 200 includes a set of users 210-214 using clients 220-224 linked to network 240. The network 240 is also linked to an iCalendar data server 230 and a feed server 235. The servers 230, 235 can send and/or receive information to/from the clients 220-224.

As shown, a user 210 can publish iCalendar data 250 which is linked to a default feed 252. Another user 212 can subscribe to this iCalendar data 250 without modification, which results in that user 212 receiving iCalendar data 250 and the default feed 252. A different user 214 can also subscribe to the iCalendar data 250, but can replace feed 252 with feed 260 and can also bind feed 262 to calendar items/entries that are associated with the iCalendar data 250. In response, user 214 can receive iCalendar data 250, feed 260 data, and feed 262 data. A calendar application in each of the clients 222-224 can handle the received iCalendar data 250 and feed 252-262 data.

Each of the clients 220-224 can be a computing device hosting a calendar application enhanced to handle syndicated feeds. The computing devices 210-214 can include a desktop computer, mobile telephone, a mobile computer, a laptop, a media player, a personal data assistant (PDA), and the like.

The computing devices 220-224 can include a transceiver for communicatively linking to network 240.

Network 240 can include any hardware/software/and firmware necessary to convey data encoded within carrier waves. Data can be contained within analog or digital signals and conveyed though data or voice channels. Network 240 can include local components and data pathways necessary for communications to be exchanged among computing device components and between integrated device components and peripheral devices. Network 240 can also include network equipment, such as routers, data lines, hubs, and intermediary servers which together form a data network, such as the Internet. Network 240 can also include circuit-based communication components and mobile communication components, such as telephony switches, modems, cellular communication towers, and the like. Network 240 can include line based and/or wireless communication pathways.

Figure 3:
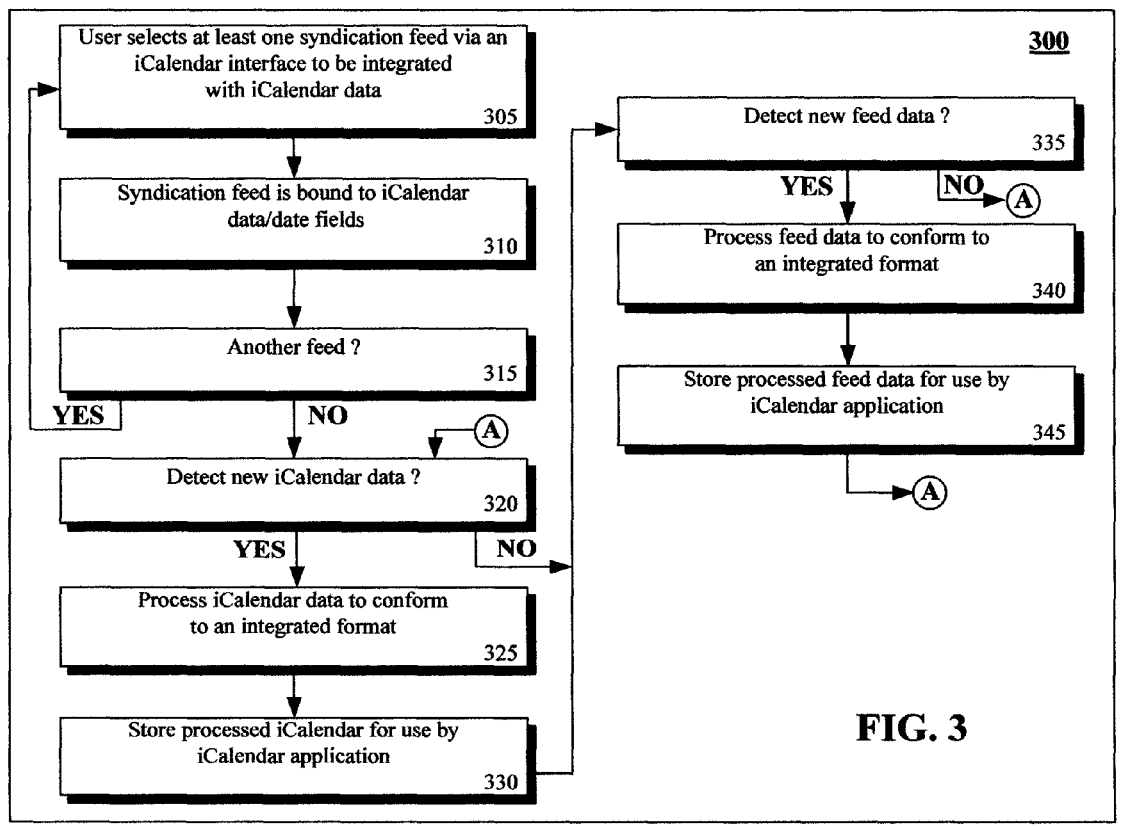
FIG. 3 is a flow chart of a method for integrating iCalendar (iCal) data and syndication feed data in accordance with an embodiment of the inventive arrangements disclosed herein.

FIG. 3 is a flow chart of a method 300 for integrating iCalendar data and syndication feed data in accordance with an embodiment of the inventive arrangements disclosed herein. The method 300 can be performed in the context of a system 100, 200, or similar system.

The method 300 can begin in step 305, where a user selects at least one syndication feed via a calendar application interface to be integrated with calendar data. In step 310, the syndication feed can be bound to a calendar date fields. In one embodiment, the syndication feed data can be converted into a calendar format, such as iCal, so that integration of the iCalendar data and the feed data can occur without any modification to a standard iCalendar compliant application. In another embodiment, database relationships can be established between feed data and the iCalendar data so that a calendar application can present both types of data proximate to suitable dates and/or calendar items. Using database relationships or other indexes to interpret both types of data has an advantage of permitting the calendar application to handle data originating from different sources (an iCalendar source or a syndication feed source) in different programmatically determined manners. In step 315, a check can be performed for additional syndication feeds. If an additional feed is to be specified, the method can proceed from step 315 to step 305, where the next feed can be defined.

In step 320, the method can detect whether new iCalendar data is available. Appreciably, a user can subscribe to iCalendar data which is periodically updated by a calendar publisher. When calendar data is not detected, the method can proceed from step 320 to step 335. When new calendar data is detected, the method can proceed from step 320 to step 325, where the iCalendar data can be processed to conform to an integrated format as necessary. In step 330, the processed iCalendar data can be stored in a computer readable medium, such as a hard drive, for later use by an iCalendar compliant application.

In step 335, new data from a syndication feed can be detected. For example, a client-side syndication feed reader can perform this detection and subsequent information downloading processes. When no new feed data is found, the method can repeat step 320, where a check for new calendar data can be performed. When new feed data is detected, the method can proceed from step 335 to step 340, where the feed data can be processed to conform to an integrated format, an iCalendar format, or other format as suitable for the implementation specifics and processing capabilities of the calendar application which consumes the processed data. In step 345, the processed feed data can be stored in the computer readable medium for later use. The method can proceed from step 345 to step 320, where the method can search for new calendar data.

Figure 4:
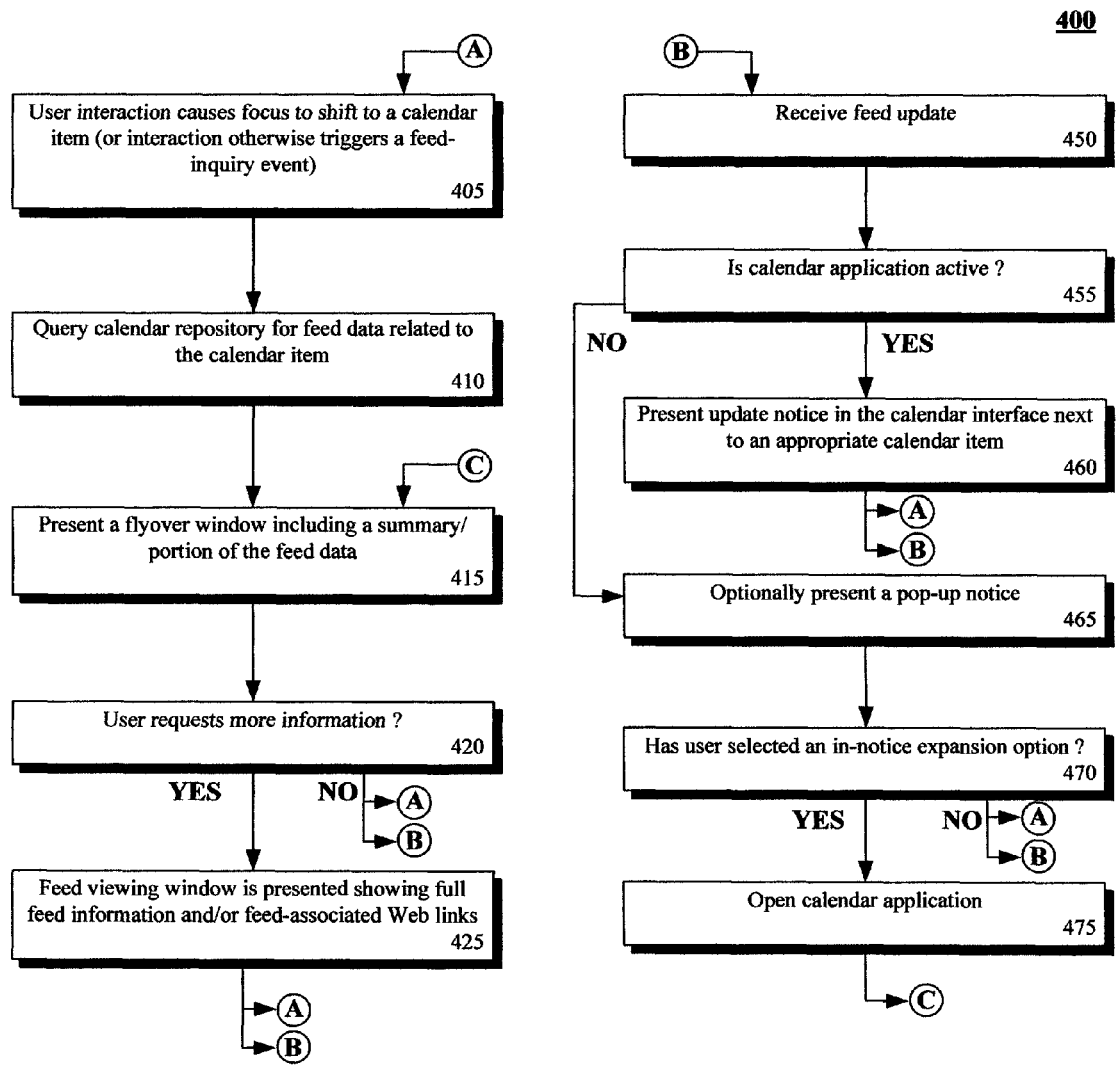
FIG. 4 is a flow chart of a method in which a calendar application selectively presents iCalendar and syndication feed data in an integrated manner in accordance with an embodiment of the inventive arrangements disclosed herein.

FIG. 4 is a flow chart of a method 400 in which a calendar application selectively presents iCalendar and syndication feed data in an integrated manner in accordance with an embodiment of the inventive arrangements disclosed herein. Method 400 assumes that feed data and iCalendar data have been specified, acquired, processed for use, and stored in a machine readable medium, as detailed by method 300. The method 400 is an event driven model which is triggered by a user interaction (steps 405-425) or a feed update event (steps 450-475).

In step 405, a user interaction can initiate an operating system event related to a calendar item which is tied to a syndication feed. One such detectable event is a mouse-over event. That is, a user can move a pointer over a calendar entry and pause for a predetermined duration, which results in a mouse-over event that initiates a syndication feed action. Other detectable events, such as a left-click event, a right-click event, a touch event, an on-focus event, a key-press event, a spoken command, and the like, can also be established to trigger the syndication feed action.

In step 410, the syndication feed action can initiate a query of a data store to determine if any feed information exists for the calendar item tied to the system event. In step 415, assuming feed data is found in the data store, the data that was found can be presented in a flyover window. In step 420, a user can optionally request more information. That is, the flyover window can present a summary or portion of data that includes Web links or expansion options for viewing full feed content. When more information is requested, a feed viewing window can be displayed showing the full feed content, as indicated by step 425. After steps 425 and/or step 420 (when no additional information is requested), the method can wait for a user interaction event or feed update, shown in FIG. 4 by steps 420 and 425 progressing to steps 405 and 450.

In step 450, a feed update can be received. In step 455, a check can be performed to determine if a calendar application is currently active. If so, the method can proceed to step 460, where the update notice can be presented in the calendar interface next to an appropriate calendar item to which the feed is tied.

If the calendar application is not active in step 455, a pop-up notice about the feed update can be presented in step 465. In step 470, a user may select an in-notice expansion option. When selected, a calendar application can be opened, as shown by step 475. The method can proceed from step 475 to step 415, where a flyover window including a feed summary can be presented next to the related calendar item. After steps 460 and/or step 470 (when no expansion is selected), the method can wait for a user interaction event or feed update, shown by steps 460 and 470 progressing to steps 405 and 450.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than foregoing the specification, as indicating the scope of the invention.

What is claimed is:

1. A method comprising:
    subscribing to a syndication feed corresponding to an event recorded for a user at a calendar application in a calendar data format, wherein the syndication feed commences sending feed data to the user of the upon occurrence of the event, the feed data indicating a status of the event;
    binding the syndication feed to a feed data entry in the calendar application that is associated with the calendar item;
    converting the feed data of the syndication feed from a feed format to the calendar data format usable by the calendar application to produce converted feed data;
    presenting the converted feed data in the calendar application proximate to the calendar item, wherein one or more of the subscribing, binding, converting, and presenting is performed by a computing device;
    detecting a feed update event for the syndication feed; and
    automatically updating the converted feed data that is presented in the calendar application responsive to the feed update event.

2. The method of claim 1, wherein the feed data includes updates which are automatically obtained from the syndication feed in substantially real time during occurrence of the event.

3. The method of claim 1, further comprising:
    identifying a syndication reader integrated to the calendar application; and
    the syndication reader automatically acquiring the updates from a feed source in accordance with the presenting step, wherein the presented feed data comprises the acquired updates.

4. The method of claim 1, further comprising:
    entering the calendar item into the calendar application; and
    detecting a calendar event resulting from a user interaction with the calendar application, wherein said feed data entry and calendar item are associated with a calendar date and time in the calendar application, and wherein the user interaction is associated with the event date and time in the calendar application.

5. The method of claim 1, further comprising:
    subscribing to a calendar data exchange formatted calendar publication; and
    presenting calendar data from the calendar publication in the calendar application at the client as the calendar item, wherein the calendar data is in a calendar data exchange format.

6. The method of claim 1, wherein the syndication feed is integrated into a calendar publication, and wherein the calendar publication comprises the feed data entry.

7. The method of claim 1, wherein the syndication feed is at least one of a Really Simple Syndication (RSS) feed and an ATOM feed, and wherein the feed data entry and calendar item is written in an iCalendar (iCal) based format.

8. The method of claim 1, wherein the syndication feed automatically updates the feed data in near real time or in real time without user intervention whenever the syndication feed updates feed data in accordance with a subscription of the subscribing to the syndication feed.

9. The method of claim 1, wherein the event is a sporting event having a score, the converted feed data presented in the calendar application indicates the score of the sporting event.

10. The method of claim 1, further comprising:
    binding a user selected syndication feed to the feed data entry using a calendar application tool provided in the calendar application.

11. A computing device comprising:
    a processor;
    a non-transitory storage device storing program instructions;
    the program instructions, wherein execution of the program instructions by the processor causes the computing device to:
        subscribe to a syndication feed corresponding to an event recorded for a user at a calendar application in a calendar data format, wherein the syndication feed commences sending feed data to the user of the upon occurrence of the event, the feed data indicating a status of the event;
        bind the syndication feed to a feed data entry in the calendar application that is associated with the calendar item;
        convert the feed data of the syndication feed from a feed format to the calendar data format usable by the calendar application to produce converted feed data;
        present the converted feed data in the calendar application proximate to the calendar item, wherein one or more of the subscribing, binding, converting, and presenting is performed by a computing device;
        detect a feed update event for the syndication feed; and
        automatically update the converted feed data that is presented in the calendar application responsive to the feed update event.

12. The system of claim 11, wherein the feed data includes updates which are automatically obtained from the syndication feed in substantially real time during occurrence of the event.

13. The system of claim 11, wherein the syndication feed is integrated into a calendar publication, and wherein the calendar publication comprises the feed data entry.

14. The system of claim 11, wherein the syndication feed is at least one of a Really Simple Syndication (RSS) feed and an ATOM feed, and wherein the feed data entry and calendar item is written in an iCalendar (iCal) based format.

15. The system of claim 11, wherein the event is a sporting event having a score, the converted feed data presented in the calendar application indicates the score of the sporting event.

16. A computer program product comprising:
    one or more computer-readable hardware storage devices;
    program instructions, stored on at least one of the one or more storage devices, to subscribe to a syndication feed corresponding to an event recorded for a user at a calendar application in a calendar data format, wherein the syndication feed commences sending feed data to the user of the upon occurrence of the event, the feed data indicating a status of the event;
    program instructions, stored on at least one of the one or more storage devices, to bind the syndication feed to a feed data entry in the calendar application that is associated with the calendar item;

program instructions, stored on at least one of the one or more storage devices, to convert the feed data of the syndication feed from a feed format to the calendar data format usable by the calendar application to produce converted feed data;

program instructions, stored on at least one of the one or more storage devices, to present the converted feed data in the calendar application proximate to the calendar item, wherein one or more of the subscribing, binding, converting, and presenting is performed by a computing device;

program instructions, stored on at least one of the one or more storage devices, to detect a feed update event for the syndication feed; and program instructions, stored on at least one of the one or more storage devices, to automatically update the converted feed data that is presented in the calendar application responsive to the feed update event.

17. The computer program product of claim 16, wherein the feed data includes updates which are automatically obtained from the syndication feed in substantially real time during occurrence of the event.

18. The computer program product of claim 16, wherein the syndication feed is integrated into a calendar publication, and wherein the calendar publication comprises the feed data entry.

19. The computer program product of claim 16, wherein the syndication feed is at least one of a Really Simple Syndication (RSS) feed and an ATOM feed, and wherein the feed data entry and calendar item is written in an iCalendar (iCal) based format.

20. The computer program product of claim 16, wherein the event is a sporting event having a score, the converted feed data presented in the calendar application indicates the score of the sporting event.

* * * * *